J. HAWORTH.
Brush for Grooming Horses.
No. 52,118.      Patented Jan'y 16, 1866.
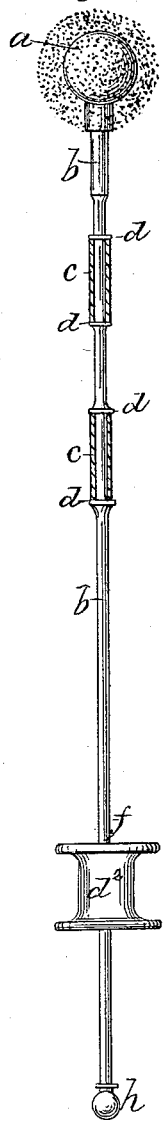
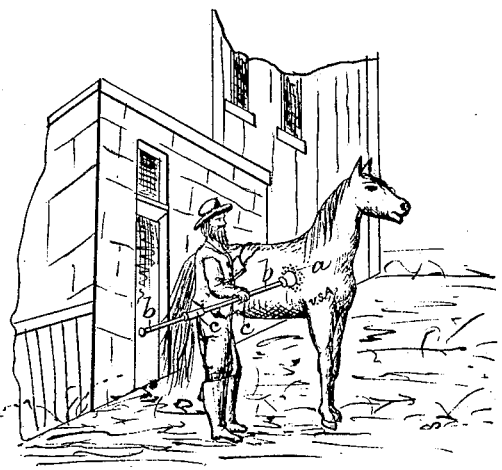
Witnesses.
Inventor.

UNITED STATES PATENT OFFICE.

JOHN HAWORTH, OF MANCHESTER, ENGLAND.

IMPROVEMENT IN BRUSHES FOR CLEANING HORSES.

Specification forming part of Letters Patent No. 52,118, dated January 16, 1866.

*To all whom it may concern:*

Be it known that I, JOHN HAWORTH, of Manchester, in the county of Lancaster, England, have invented a new and useful Improvement in the Grooming and Cleaning of Horses and other Animals; and I do hereby declare that the following is a full, clear, and exact description thereof, which will enable others skilled in the art to make and use the same, reference being had to the accompanying drawings, forming part of this specification.

This invention relates to brushing and cleaning horses and other quadrupeds by means of a rotating brush or other suitable instrument, to which rapid motion is given by steam or other power. The brush or other instrument thus used is fixed to the end of a pole furnished with loose handles and with a roller or pulley, around which pulley is passed the band or strap to the shaft for driving the same. The brush is capable of being moved up and down and from one side to another, and when used is to be guided by the attendant over the surface of the animal to be brushed and cleaned, thereby economizing manual labor and performing the operations expeditiously and effectually, and removing the dandruff or other impurities of the skin without the use of the curry-comb.

In the accompanying plate of drawings, Figure 1 is a view of the rotating brush in the direction of its length, showing its handles in section; and Fig. 2, a perspective view of the brush and its shaft, showing it as used in the grooming or cleaning of a horse.

Similar letters of reference indicate like parts.

$a$ is a spherical-shaped brush, which I prefer to make of bristles fixed in a wooden block or form; but it may be made of other materials, and also of other forms, the brush being screwed to one end of a pole or shaft, $b$, by a screw-thread, or in any proper manner, so that it may be easily removed and another substituted for it. On the pole $b$, and toward the brush end of it, are mounted two handles or sleeves, $c\ c$, which are loose on the pole, but are held from a lateral play by raised lips $d$ at each of their ends. To the pole $b$, at $f$, is fixed a flanged pulley, $d^2$, around which is to be passed an endless belt or band, which passes to and around any suitable shaped pulley upon the shaft to which the power used—be it steam, horse, or other power—is applied, so that, as the said driving-shaft is thus revolved, the pulley $d^2$, and consequently the pole upon which it is screwed and its brush, will be similarly rotated, the said pole, when so revolved, being held in the hands of the attendant by grasping it by its loose handles or sleeves, hereinbefore referred. To the pulley end of the pole $b$ is fixed a weight, $h$, the object of which is to counterbalance the pole and brush, and thus relieve the operator from its weight.

The mode of operation is as follows: The horse or other quadruped to be groomed or cleaned is first secured in the usual manner, and then the operator, taking the pole by one or both of its loose handles $c\ c$, applies the brush, which is made to rotate rapidly, as above described, to the surface of the animal, the connecting-belt for the pole, of course, swinging with the horizontal vertical or lateral movement, as the case may be, which is given to the pole by the operator in moving the brush over and bringing it to bear against the body of the animal being operated upon. By thus applying rotating brushes to the grooming and cleaning of horses and other quadrupeds in the manner substantially above described, manual labor is economized and the operation is performed expeditiously and effectually with less torment to the animal and less danger to the operator than by the old mode; and, furthermore, the removal of the dandruff and other impurities of the skin is accomplished without the use of the curry-comb, as has heretofore been necessary, the importance of which is obvious.

What I claim as new, and desire to secure by Letters Patent, is—

Grooming and cleaning horses and other quadrupeds by means of a brush attached to a pole or shaft having loose handles and a suitable-shaped pulley, through which pulley a rotating motion is imparted to the said brush by connecting it with any suitable driving power, substantially as described.

JOHN HAWORTH.

Witnesses:
H. B. BARLOW,
   *Patent Agent, Manchester.*
JOHN PERKINS,
   *Draftsman, Manchester.*